United States Patent [19]
Granger

[11] Patent Number: 6,058,357
[45] Date of Patent: *May 2, 2000

[54] COLOR MEASUREMENT SYSTEM INCLUDING A DIGITAL COLOR SENSOR AND A HOST COMPUTER IN COMMUNICATION WITH THE COLOR SENSOR

[75] Inventor: Edward M. Granger, Rochester, N.Y.

[73] Assignee: Light Source Acquisition Company, Grandville, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,769

[22] Filed: Aug. 8, 1997

Related U.S. Application Data

[62] Division of application No. 08/393,987, Feb. 24, 1995, abandoned.

[51] Int. Cl.[7] .................................................. G01N 21/25
[52] U.S. Cl. ........................... 702/104; 702/85; 356/402; 356/408
[58] Field of Search ..................................... 364/526, 525, 364/571.01–571.04, 498; 358/504, 515, 512, 518, 509, 523, 406; 356/402, 405–408, 416, 419, 425, 422, 305, 303, 319, 326, 332, 334, 328; 250/226, 228, 339.07, 339.09, 214 C; 345/22, 153, 186, 199; 382/162, 167, 191; 355/88; 348/650, 242, 253, 645, 263, 181, 182, 189, 190; 347/232; 702/22, 27, 28, 40, 30–32, 76, 77, 85, 90, 104, 107, 116, 121–126, 182–185, 189, 193, 190, 191, 195, FOR 115–FOR 118, FOR 132, FOR 171, FOR 156–FOR 164, FOR 166, FOR 168, FOR 170; 324/76.19, 76.21, 76.22

[56] References Cited

U.S. PATENT DOCUMENTS

| | | | |
|---|---|---|---|
| 4,352,561 | 10/1982 | Tohyama et al. | 356/332 |
| 4,437,764 | 3/1984 | Levine et al. | 348/242 |
| 4,773,761 | 9/1988 | Sugiyama et al. | 356/416 |
| 5,268,737 | 12/1993 | Fukuma et al. | 356/328 |
| 5,272,518 | 12/1993 | Vincent | 356/405 |
| 5,319,437 | 6/1994 | Van Aken et al. | 356/326 |
| 5,359,409 | 10/1994 | Wildnauer et al. | 356/334 |
| 5,371,537 | 12/1994 | Bohan et al. | 348/181 |
| 5,400,138 | 3/1995 | Peterson et al. | 364/526 |
| 5,467,412 | 11/1995 | Capitant et al. | 382/167 |
| 5,509,086 | 4/1996 | Edgan et al. | 382/167 |
| 5,691,817 | 11/1997 | Cargill et al. | 356/405 |

*Primary Examiner*—Hal Wachsman
*Attorney, Agent, or Firm*—Townsend and Townsend and Crew LLP

[57] ABSTRACT

A desktop color measurement system that includes an instrument capable of making color measurements. The system includes a host computer and a digital color sensor (DCS) in communication with the host computer. The DCS includes optical elements for making spectral measurements, and control electronics for controlling the optical elements. In a specific embodiment, the DCS is dedicated to the mechanics of acquiring the raw data. The host computer, which may be a personal computer, performs all the calculations needed to convert raw measurement values into spectral data and other color representations such as tristimulus values and density. This also allows the system to function as a calorimeter and a densitometer as well as a spectrophotometer. The DCS control circuitry includes non-volatile writable storage for information obtained during a factory calibration procedure, which information allows the user to recalibrate the DCS in the field.

15 Claims, 7 Drawing Sheets

COLOR MEASUREMENT SYSTEM INCLUDING A DIGITAL COLOR SENSOR AND A HOST COMPUTER IN COMMUNICATION WITH THE COLOR SENSOR

This is a Division of U.S. application Ser. No. 08/393,987 filed Feb. 24, 1995, now abandoned.

BACKGROUND OF THE INVENTION

The present invention relates generally to color measurement systems, and more specifically to techniques for providing accurate and precise color measurements at a low cost.

Many endeavors, such as the print and graphics arts, require exacting control of color in many steps of their processes. Such control requires accurate and precise color measurements, including reflective measurements for examining printing inks and emissive measurements for calibrating monitors. Unfortunately, accurate and precise color measurements are difficult and have typically required optical instruments such as spectrophotometers, calorimeters, and densitometers, which incorporate expensive optical and electronic components.

High dynamic range is one contributor to measurement difficulty. A light source to be measured may have intensities that vary over many orders of magnitude from one end of the spectrum to the other. This has typically been addressed by digitizing detector signals with many bits of precision in order to properly evaluate subtle differences in color, which has added considerable expense. Further, the overall intensities of different sources may vary over a considerable range, depending on the type of measurement required. This has typically been addressed by providing individual dedicated instruments for the different types of measurement.

Another source of expense is that the optical instruments have typically required a powerful dedicated computer to perform the computations that transform raw digitized signals into values that are meaningful to the user. This problem is compounded when several different optical measurements need to be made, each one requiring a different specific instrument, each with its own dedicated computer.

Further, optical instruments-are often plagued by what is called veiling glare, the problem of light getting into places it doesn't belong. An example of this occurs in a spectrophotometer that uses a type of monochromator known as a diffraction grating. A diffraction grating spatially separates the different spectral bands of an incident light beam so that the energy in a given spectral band can be measured by rotating the grating to bring the desired spectral band onto a detector. Experience has shown that grating imperfections and other sources of scattered light result in a type of crosstalk where, when the grating is oriented so as to direct light of a particular spectral band toward the detector, small amounts of light of other spectral bands also reach the detector. This can compromise the integrity of the measurement. Possible solutions include using expensive optical components to minimize veiling glare, adding a second monochromator to reduce the error, or both.

These are but a few examples of the technical problems that contribute to the high cost of making accurate and precise color measurements. Thus, while recent advances and price reductions in computer hardware and software have brought many of the necessary graphics and publishing resources to the desktop, the costs of optical instruments for managing and controlling color have typically remained out of the price range of all but the largest commercial enterprises.

SUMMARY OF THE INVENTION

The present invention provides a desktop color measurement system that includes an inexpensive versatile instrument capable of making accurate and precise color measurements.

According to one aspect of the invention, a color measurement system includes a host computer and a digital color sensor (DCS) in communication with the host computer. The DCS includes optical elements for making spectral measurements, and control electronics for controlling the optical elements.

In a specific embodiment, the DCS is dedicated to the mechanics of acquiring the raw data. This avoids the need for an expensive and powerful computer for the DCS, because the host computer, which may be a personal computer, performs all the calculations needed to convert raw measurement values into spectral data and other color representations such as tristimulus values and density. This also allows the system to function as a calorimeter and a densitometer as well as a spectrophotometer. The DCS control circuitry includes non-volatile writable storage for information obtained during a factory calibration procedure, which information allows the user to recalibrate the DCS in the field.

According to a further aspect of the invention, the DCS accommodates a wide range of signal levels by dynamically determining an appropriate duration for a given measurement. In particular, the DCS uses an n-bit A/D converter (n is 12 in a specific embodiment), but is able to provide almost $n-1$ bits of precision over a wide range. The DCS accomplishes this by measuring light in each spectral band for as long as necessary to achieve the desired level of precision (subject to certain necessary constraints). The DCS thus generates a number representing the amount of light in the spectral band and associates this number with an indication of the duration of the measurement. This allows the measurement data to be efficiently stored and efficiently communicated to the host computer.

In a specific embodiment, light in a given spectral band is directed to a detector, which generates an electrical signal representing the amount in the given band. This signal is integrated over time, and the DCS checks the integrated value after a certain integration time to determine whether or not the value is large enough to represent a sufficient level of precision. If not, the signal is integrated for a longer time and rechecked. This process is iterated until the value meets (i.e., equals or exceeds) a size threshold. In the specific embodiment, where the value is digitized to 12 bits of precision and the integration time is doubled on each iteration, the threshold is a number somewhat less than half the maximum number (4095) that can be encoded in 12 bits. A threshold of 30–45% is appropriate.

In this embodiment, the host computer receives the spectral data in the form of a 12-bit integrator value and a 4-bit index representing the integration time for each band. The index is used to perform a relative normalization so that integrator values that were measured using shorter integration times are weighted upwardly.

According to a further aspect of the invention, measured values are corrected for veiling glare by deconvolution with a function that represents the manner in which veiling glare affects the different bands. This lowers cost since there is no need for more than a single monochromator in the DCS. In a specific embodiment, the correction is applied by subtracting a correction term that represents the product of a correction matrix and a vector representative of measured values.

For an embodiment where there are N bands, so that the vector of measured values is an N×1 column vector, the correction matrix would be N×N. However, it has been recognized that the matrix coefficients vary smoothly over the spectral range, and so it is possible to achieve computational efficiency by reducing the order of the correction matrix to N×M where M is significantly less than N, and multiplying this reduced matrix with a measurement vector that has been reduced to an M×1 column vector. This reduction can be by subsampling or averaging neighboring values.

A further understanding of the nature and advantages of the present invention may be realized by reference to the remaining portions of the specification and the drawings.

DESCRIPTION OF SPECIFIC EMBODIMENTS

Overview

Figure 1A:
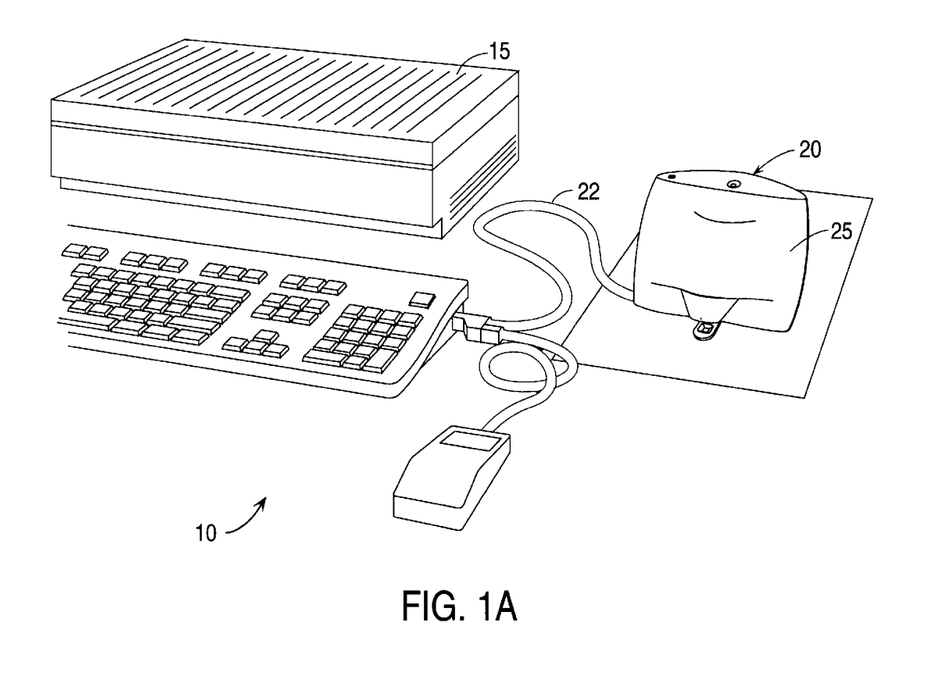
FIG. 1A is a pictorial representation of a color measurement system embodying the present invention.

FIG. 1A is a pictorial representation of a color measurement system 10 including a host computer 15 and a digital color sensor (DCS) 20. The host computer and DCS are shown connected by a cable 22, but other communication channels, including wireless, are also possible. DCS 20 includes a housing 25 in which are located electronic, mechanical, and optical components for performing color measurements.

The system may be used to provide a wide variety of color management functions, including operation as a spectrophotometer, calorimeter, or densitometer. The system can be used to calibrate computer monitors and can be used to capture colors from any source for use for any purpose in software applications, such as coloring text and graphics objects. The basic operation of DCS 20 is to provide spectral data that can be manipulated in the host computer as desired. In the specific embodiment, DCS 20 provides spectral data corresponding to 32 10 nm spectral bands in the range of 380–700 nm. These spectral bands are often referred to simply as bands.

Figure 1B:
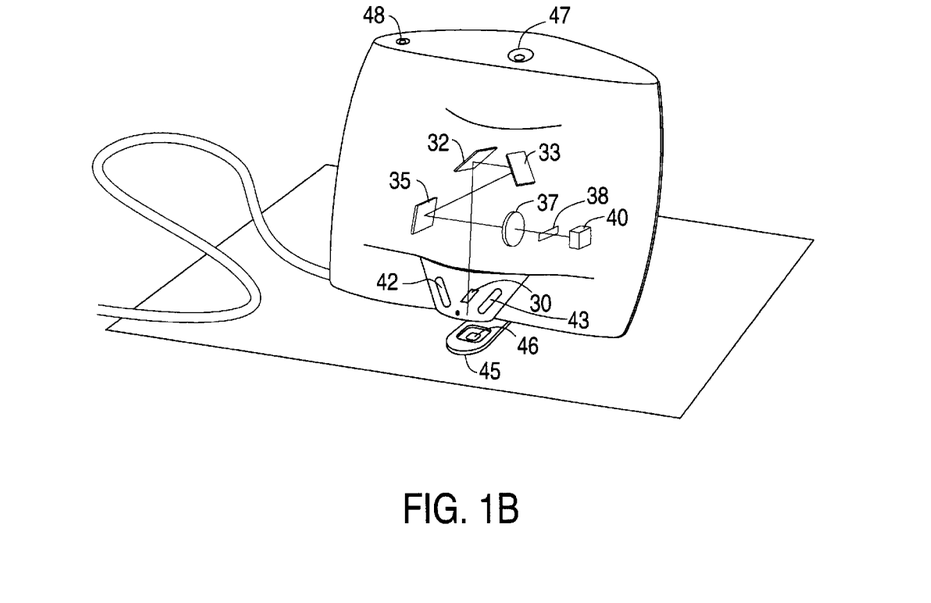
FIG. 1B is a pictorial representation showing the optical train of the digital color sensor (DCS) in the color measurement system.
Figure 1C:
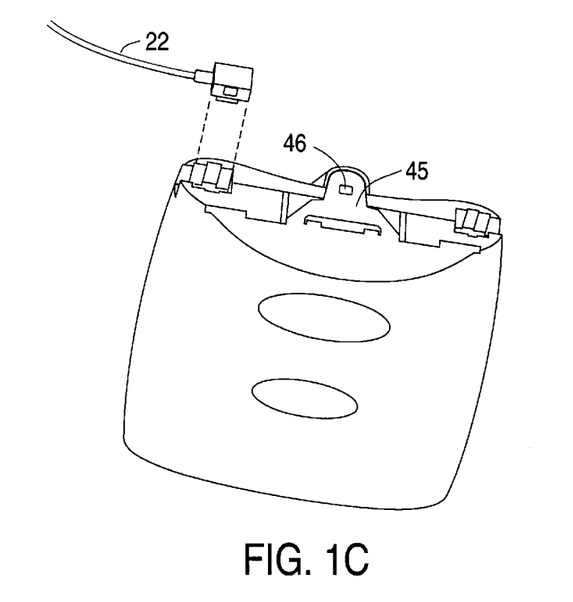
FIG. 1C is a bottom view of the DCS.

FIG. 1B shows the optical train inside housing 25 while FIG. 1C provides a bottom view of DCS 20. A portion of the bottom of the housing is formed with an aperture (not shown) to allow light from outside the DCS to enter the DCS. Light entering DCS 20 through this aperture encounters, in light path order, a first slit 30, a pair of folding mirrors 32 and 33, a diffraction grating 35, a lens 37, a second slit 38, and a detector 40. Grating 35 is rotated by a stepper motor (not shown in this view) and cooperates with slit 38 to define a monochromator that restricts the wavelength of light reaching the detector to a selected one of a plurality of bands. Other suitable monochromators, such as prisms and filter wheels, could be used. Detector 40 may be any device that provides a signal that is representative of the light incident on the device. The specific embodiment uses a photodiode, which provides a current proportional to amount of light. However, other photoelectric devices such as photoconductive devices and phototransistors could also be used.

A source of broadband visible radiation is provided to illuminate samples for measurements of their reflective properties. In the specific embodiment the light source includes a pair of tungsten lamps 42 and 43 mounted to the housing but outside the optical enclosure. The DCS is provided with a mechanism that allows the user to align the DCS with the sample and illuminate the sample with the lamps so that the light reflected from the sample enters the DCS.

In the specific embodiment, the detector is about 4 times as sensitive to red light as blue. The grating is, however, designed to have maximum efficiency for blue light, so the combination of the grating and detector has a response that is relatively flat across the spectrum.

In the specific embodiment, the mechanism includes a measurement foot 45 formed with a measurement aperture 46. The foot is pivotally mounted to the housing for movement between first (alignment) and second (measurement) relative positions. In the first position, shown in FIGS. 1A and 1B, the plane of the foot is at an acute angle to the bottom surface of the housing, so that the measurement foot and measurement aperture are visible from above. In the second position, shown in FIG. 1C, the plane of the foot is parallel to the bottom surface of the housing, and the foot fits into a recess in the bottom of the housing. In the specific embodiment, measurement aperture 46 is 3 mm×5 mm while slit 30 limits the effective aperture to 3 mm×3 mm. The measurement foot is detachable to allow other types of measurements to be made.

DCS 20 is provided with indicator lights including a measurement indicator 47 and a battery indicator 48. Measurement indicator 47 provides a first indication (green in the specific embodiment) when the DCS is ready to make a measurement and a second indication (red in this specific embodiment) when a measurement is in progress. Battery indicator 48 provides an indication when a recharge of the DCS's internal battery is necessary or is in progress.

Figure 2A:
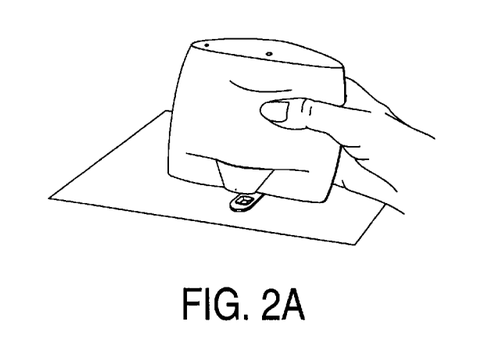
FIGS. 2A and 2B show a user taking a measurement with the DCS.
Figure 2B:
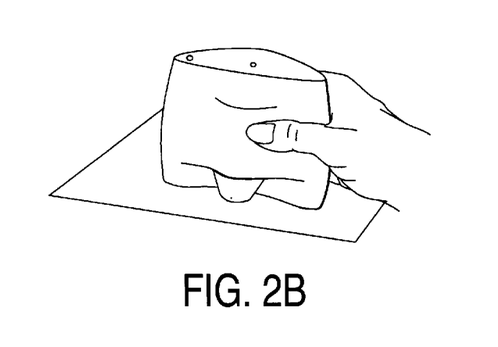

FIGS. 2A and 2B show a user's hand manipulating DCS 20 to effect a reflectance measurement from a portion of a sample, which is assumed to be horizontal. The user, as shown in FIG. 2A, first positions the measurement foot on the sample with the measurement aperture over the sample's region of interest. The foot and housing are in the first relative position, so that the bottom surface of the DCS is tilted upwardly from the plane of the measurement foot. This allows the user to place the measurement aperture over the desired portion of the sample.

As shown in FIG. 2B, the user initiates a measurement by tilting the housing toward the measurement foot. Measurement aperture 46 is thus brought into alignment with the aperture in the housing. When the DCS is in this position, the sample is shielded from ambient light, so that only light from light sources 42 and 43 is reflected from the sample and reaches the DCS detector.

Figure 3:
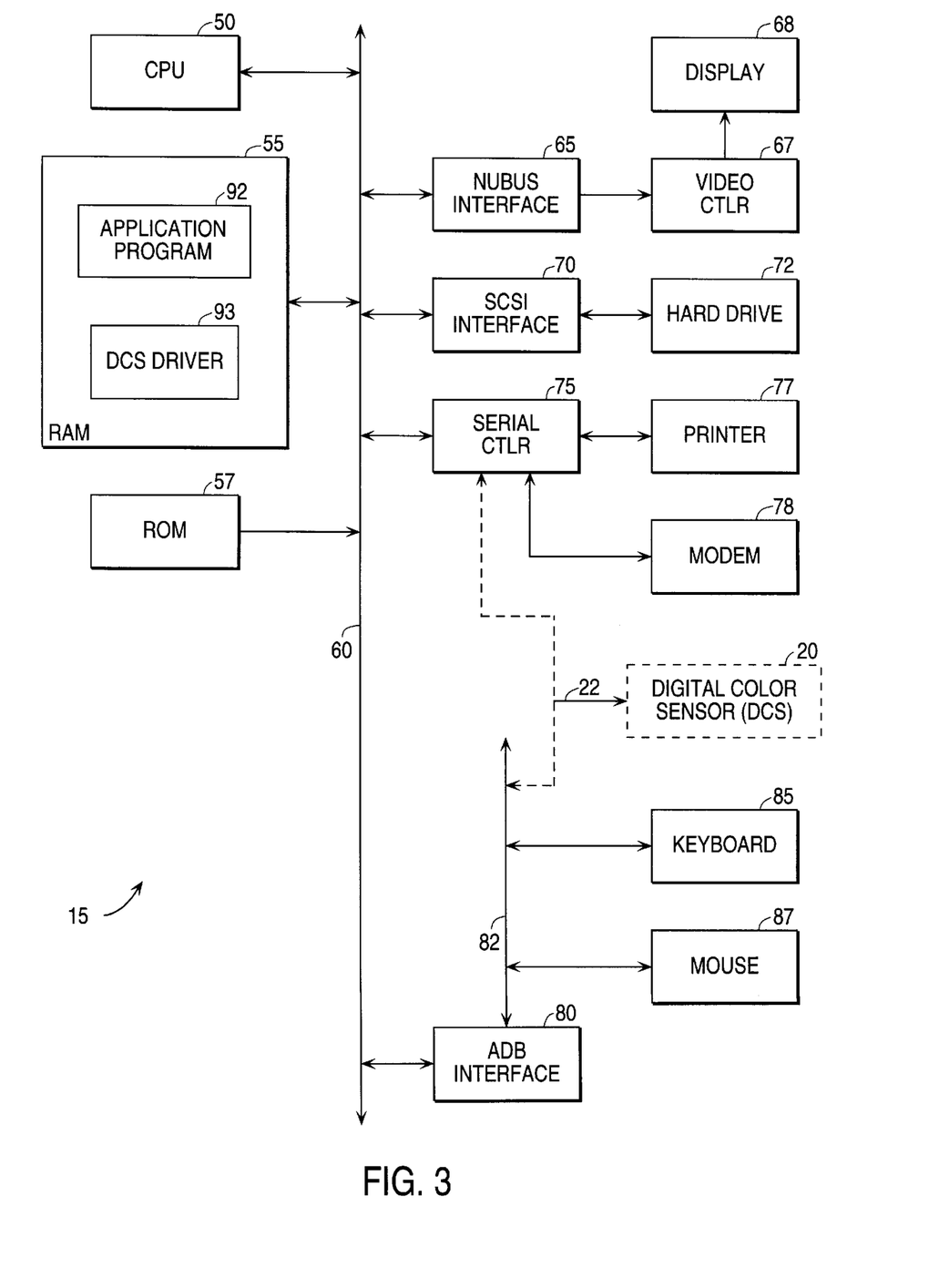
FIG. 3 is a block diagram of the host computer in the color measurement system.

FIG. 3 is a block diagram of host computer 15. While the present invention is not limited to any particular type of computer, the specific embodiment uses an Apple Macintosh computer, and the figure generally reflects that type of computer's architecture. In accordance with known practice, host computer 15 includes a CPU 50 which communicates with memory, including random access memory (RAM) 55 and read only memory (ROM) 57, via a system bus 60.

A number of bus interface devices are coupled to system bus 60 to define additional buses and ports for communication with additional peripheral devices. These interface devices include a NuBus interface 65 for communication with devices such as a video controller 67 and associated display device 68, a SCSI bus interface 70 for communication with one or more devices such as a hard drive 72, a serial communications controller 75 having a number of serial ports for communication with devices such as a printer 77 and a modem 78, and an interface 80 for communication with peripheral devices on what is referred to as the Apple Desktop Bus (ADB) 82. Typically, input devices such as a keyboard 85 and a mouse (or trackball) 87 are connected to ADB 82. In the specific embodiment, DCS 20 may be connected to ADB 82 or one of the serial ports connected to serial controller 75. DCS 20 is shown, in phantom, as being connected either to a serial port or to ADB 82.

If, instead of a Macintosh computer, the host computer were an IBM-compatible personal computer, the bus architecture would be different, possibly with different combinations of devices coupled to various expansion buses. The DCS could be coupled to a serial port or to an expansion bus (e.g., the EISA, MCA, PCI bus depending on the computer).

RAM 55 is used to store data and instructions, including DCS control software. This DCS control software can be in many forms: 1) one or more software files compiled directly into an application that uses the DCS, 2) a library that is linked into an application that uses the DCS, or 3) a stand-alone software component that communicates with an application that uses the DCS. The third case can be implemented in many forms, some dictated by the operating environment and in some cases as matters of design choice. Examples include but are not limited to the following: a) a Macintosh device driver, b) a Macintosh component, c) a Windows DLL (Dynamically Linked Library), d) an MS/DOS device driver, c) a separate control application that communicates via a system or network communications facility. In the specific embodiment, an application program 92 communicates with a DCS driver 93.

Figure 4:
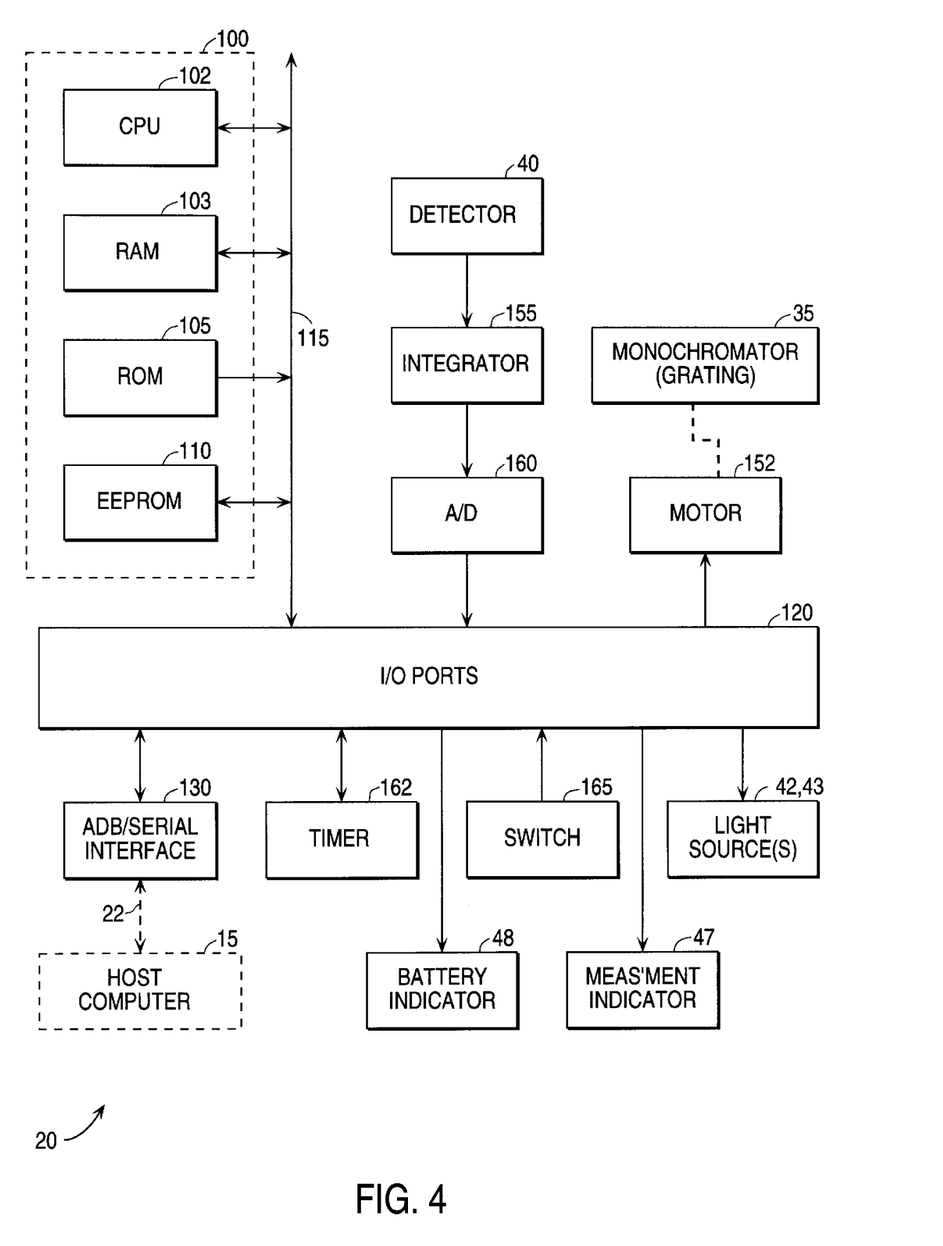
FIG. 4 is a block diagram of the DCS.

FIG. 4 is a block diagram of the electronic, mechanical, and optical components within housing 25 of DCS 20. The electronics include a DCS computer 100, which includes a CPU 102, a RAM 103, a program ROM 105, and a non-volatile read/write memory such as an electrically erasable programmable read-only memory (EEPROM) 110, which communicate on a system bus 115. The CPU, RAM, program ROM, and EEPROM could be separate integrated circuits, but are preferably integrated on a single microcontroller chip such as a Motorola 68HC705. In the specific embodiment the EEPROM has 128 16-bit words.

DCS computer 100 communicates with host computer 15, shown in phantom, and the other components through an I/O interface 120 having a number of I/O ports. The host computer is shown as coupled through a self-configuring ADB/serial interface 130. The optical elements shown in the figure include monochromator 35, detector 40, grating 35, light sources 42 and 43, measurement indicator 47, and battery indicator 48. The grating is shown as being controlled by a stepper motor 152.

Detector 40, which in the specific embodiment is a photodiode, provides a signal that is proportional to incident flux. This signal is integrated by an integrator 155, whose output is digitized with an A/D converter 160 which is coupled to interface 130. In the specific embodiment, the integrator comprises an operational amplifier having the photodiode coupled across its inputs and a capacitor between the photodiode and the amplifier output. Thus, the photocurrent from the photodiode charges the capacitor to provide an output voltage.

The system electronics also include a timer 162, which is used to set integration times, and a switch 165 that provides an indication when measurement foot 27 is in the measurement position so that a measurement can be made. In the specific embodiment, the timer is clocked at 2-microsecond intervals. The system electronics also include a number of A/D converters (not shown), which are used for sampling various voltages in the DCS.

Measurement Process

Figure 5:
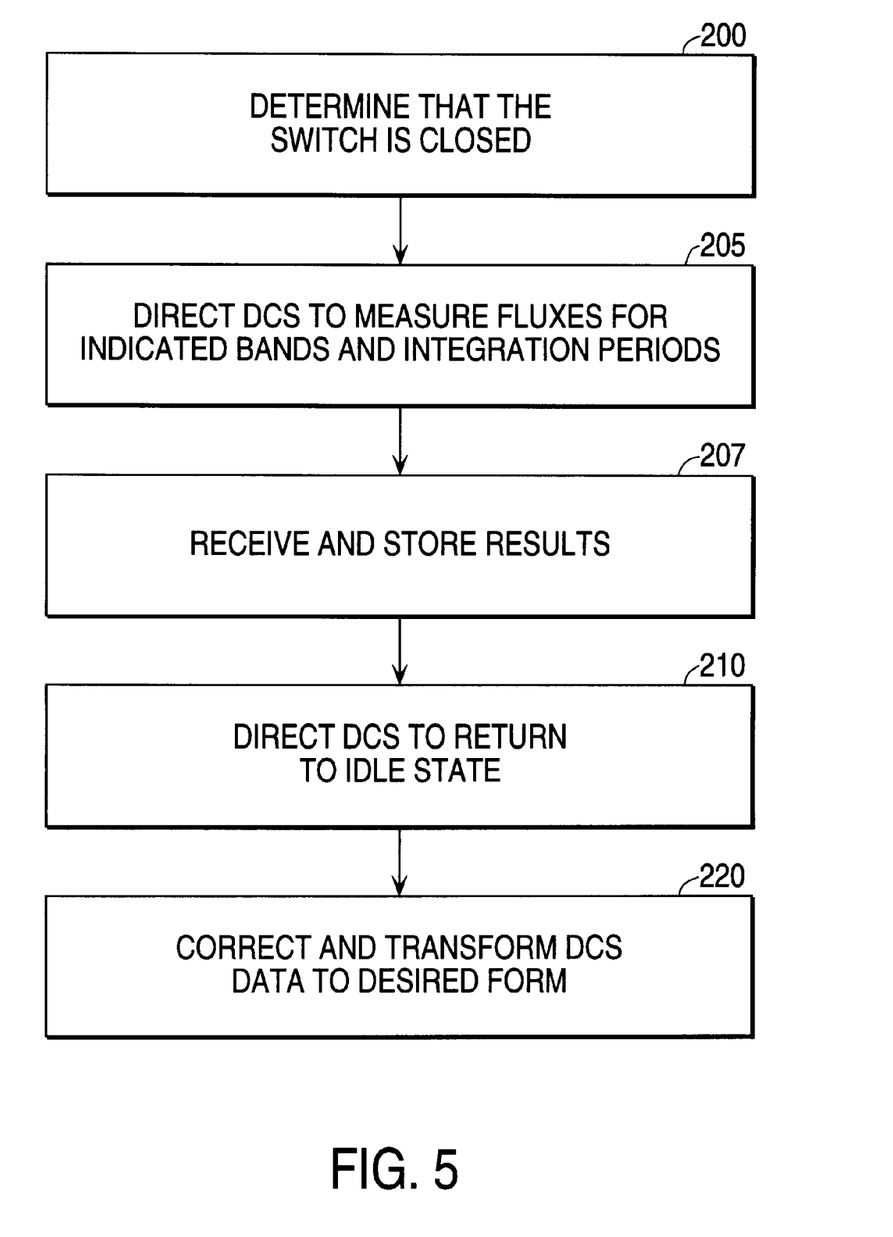
FIG. 5 is a flow chart showing a method performed by the host computer to carry out the color measurement using the DCS.

FIG. 5 is a flow chart showing a method performed by host computer 15 for carrying out a color measurement. This measurement may be a reflective measurement, a transmissive measurement or an emissive measurement, as selected by the user. The measurement sequence is initiated when the host computer determines that switch 165 has been closed (step 200), which occurs when the user has moved DCS 20 into the measurement position. In the specific embodiment, the state of the switch is stored in a status register, and the host computer reads the status register periodically to check whether the switch is closed.

In response to a determination that the switch has been closed, the host computer directs the DCS to measure fluxes for some or all of the 32 bands using some or all of 16 stored integration times (step 205). The host computer then receives and stores the results as they are generated (step 207). When all the data has been received, the host computer, as a precautionary measure, directs the DCS to return to its idle state (step 210). Host computer 15 then performs computations to correct and transform the flux values from the DCS into values appropriate to the type of measurement being performed (step 220). This computation uses calibration values stored in EEPROM 110, as will be described below.

Table 1 is a table of the commands for DCS driver 93 with brief explanations for each. As can be seen, the ReadScan driver command directs DCS 20 to measure a range of bands, which are measured in sequence, with a possible restriction to a subset of the 16 built-in integration times. These integration times allow precise measurements over a large dynamic range. Each value is twice as long as the previous to provide a dynamic range of $2^{27}$. In the specific embodiment, the integration times range from 128 microseconds, which corresponds to $2^6$ consecutive 2-microsecond intervals, to the longest 4.2 seconds, which corresponds to $2^{21}$ consecutive 2-microsecond intervals.

The flux measurement is encoded in 16 bits, consisting of a 12-bit integer representing the digitized integrator output voltage and a 4-bit index representing the integration time that gave rise to the 12-bit value. As will be described below, the measurement process is dynamic in the sense that longer integration times are used for lower intensities. The digitized integrator voltage will be referred to as the integrator value. The packed quantity consisting of the index and integrator value will sometimes be referred to as DCS data.

Clearly, if more than 16 bits are available to store the index and integrator value, it is possible to encode a larger range of integration times and larger integrator values. More bits for the integrator value would require a more expensive A/D converter than the 12-bit A/D converter currently used. More bits for the index would allow greater dynamic range.

Further, the index could encode the integration times differently, such as lower numbers signifying longer integration times.

The flux measurement uses 4 parameters, designated ITIMIN, ITIMAX, ITITHRES, and INTEGVTHRES. Each of the first three is an index between 0 and 15 representing an integration time, with the value of 0 representing the first value (128 microseconds) and a value of 15 representing the last entry (4.2 seconds).

ITIMIN is one of the arguments of the ReadScan command, and specifies the shortest integration time allowed for the measurement, with a default value of 0 if the control program from the host computer does not specify a value.

ITIMAX is also one of the ReadScan arguments, and specifies the longest integration time allowed for the measurement, with a default value of 15 if the control program does not specify a value.

ITITHRES specifies the shortest integration time that the DCS can combine with subsequent integration times in the iterative measurement process. In the current implementation, the control program cannot specify a value for this parameter, but rather a default value of 5 is used.

INTEGVTHRES is a 12-bit positive value specifying an integrator value that is considered to provide sufficient precision for a measurement. The value should be less than one-half the maximum 12-bit value, say 30–45%, to allow doubling the integration time without overflow. In the current implementation, the control program cannot specify a value for this parameter, but rather a default value of 1365 is used. This is one-third of the maximum value (4095) of an unsigned 12-bit number.

Figure 6:
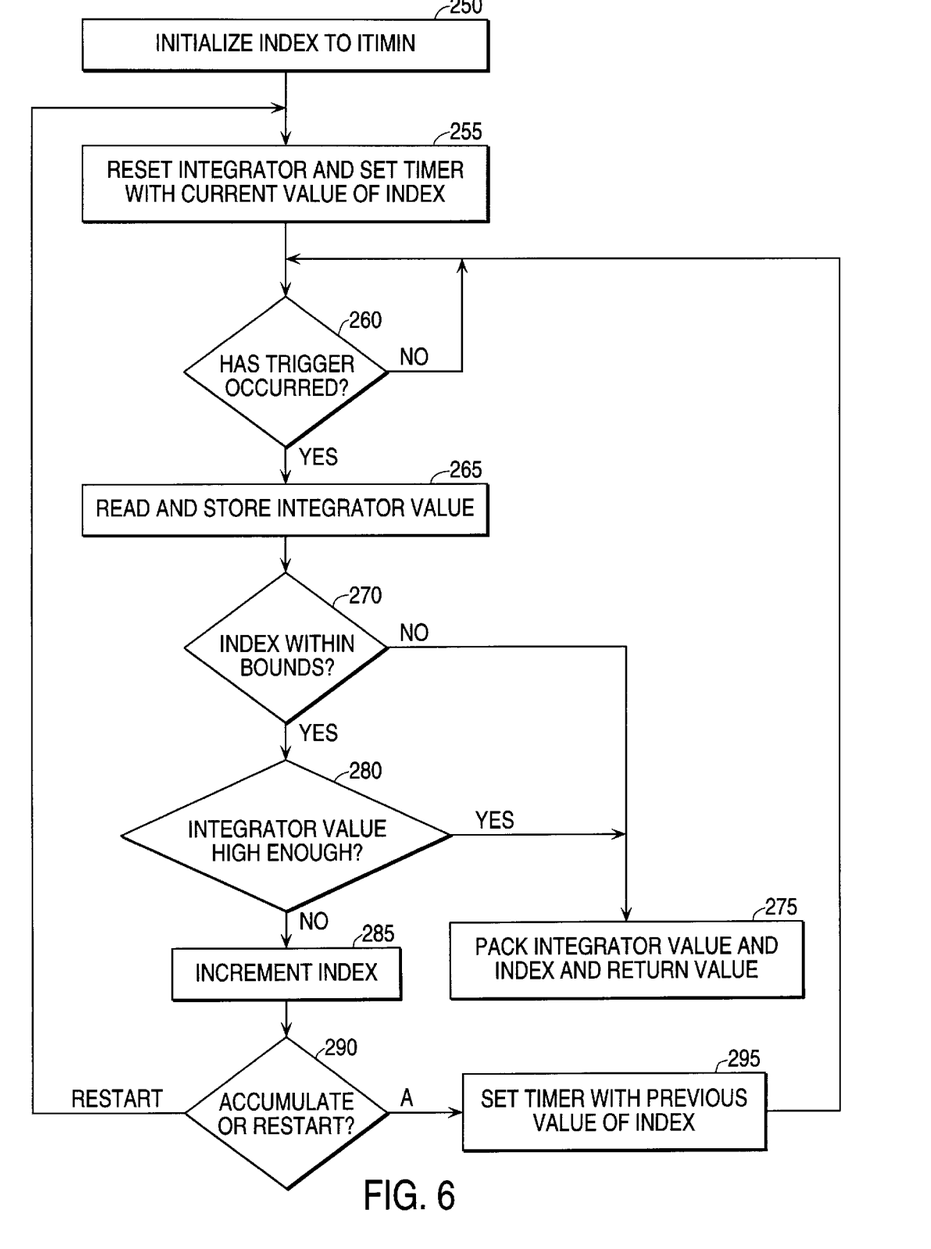
FIG. 6 is a flow chart showing a method performed by the DCS computer to carry out a flux measurement.

FIG. 6 is a flow chart showing a method performed by DCS computer 100 to carry out a flux measurement for a given band. The basic operation of the program is to start with the shortest integration time (specified by ITIMIN) and iteratively increase the period until the integrator value is high enough (INTEGVTHRES) to provide a desired level of precision. For the shorter integration times (those specified by indices less than ITITHRES), if the integrator value is too low, the integrator is reset and run for the next higher integration time. For the longer integration times, if the integrator value is too low, the integrator is allowed to continue to run so that it integrates for a total time equal to the next longer integration time.

The program is controlled by an index specifying the integration time. The DCS computer initializes the index to the value of ITIMIN (step 250). The DCS computer resets integrator 155 to zero and sets timer 162 to trigger after a time corresponding to the current value of the index (step 255). As the timer counts, the integrator accumulates a voltage, which ultimately will represent the measured flux.

The program then takes no further action until a trigger is received from the counter. This is shown schematically as a loop with test block 260, testing whether a trigger has occurred. This is more likely to be implemented using an interrupt. In any case, when a trigger occurs, the integrator voltage is digitized and stored (step 265).

The DCS computer tests whether the index is equal to ITIMAX or equal to 15 (step 270). If so, the measurement is considered complete, and the DCS data comprising the 4-bit value of the index along with the 12-bit integrator value are returned (step 275). If the index is less than ITIMAX, a further test is made to determine whether the integrator value, read at step 265, is greater than or equal to INTEGVTHRES (step 280). If so, the integrator voltage is considered to have reached an acceptable value, and the branch is taken to step 275. If the integrator value is less than INTEGVTHRES, operation continues and the integration time is increased to the next value by incrementing the index (step 285).

The index is then compared with the integration time index threshold ITITHRES (step 290). A value below threshold indicates that the corresponding integration time is too short to reliably capture an on-going integration ramp, since foreground communications interrupts and the like might interfere with the tight timing. In such a case, a branch is taken to step 255, where the integrator is reset and the timer restarted with an integration time corresponding to the current value of the index.

If the current value of the index indicates a sufficiently long integration time, the timer is restarted for the previous integration time (step 295) and the integration is allowed to continue until the next trigger from the timer. Note that restarting the timer with the previous integration time without resetting the integrator effectively doubles the integration time at which the next trigger will cause a value to be read from the integrator. Since the purpose is to trigger again after integrating a total of twice the earlier integration time, it may be preferable to restart the timer for a slightly shorter interval to account for processing delays in restarting the timer.

Thus, assuming that a sufficiently wide range of index values was permitted by ITIMIN and ITIMAX, the integrator voltage will automatically be sampled over an interval sufficient to provide an integrator value at least as high as INTEGVTHRES, which represents more than 10 bits of precision.

Data Correction and Transformation

As discussed above with reference to FIGS. 5 and 6, a user makes a measurement by interacting with the host computer DCS control software to specify the type of measurement, and then moving DCS 20 so as to actuate switch 165. The host DCS control program then issues a number of driver commands which are communicated to the DCS. The DCS returns up to 32 flux measurements, each in the form of a packed 16-bit data item comprising a 12-bit raw count from the integrator and a 4-bit index allowing a determination of the integration time for the flux count.

The 16-bit DCS data items returned by the DCS are subjected to a number of corrections and transformations before they can be used as representations of measured flux in the bands. The corrections include offsets for electronic noise and stray light from the DCS's light sources, a deconvolution for crosstalk between the bands, and a correction for time variations in the DCS's components.

Certain of the corrections are based on correction values generated in a calibration procedure. The DCS is calibrated at the factory prior to shipment, and is periodically calibrated in the field by the user. For the present discussion, it will be assumed that the required correction parameters have been measured and stored. The way these parameters are determined will be discussed below.

Figure 7:
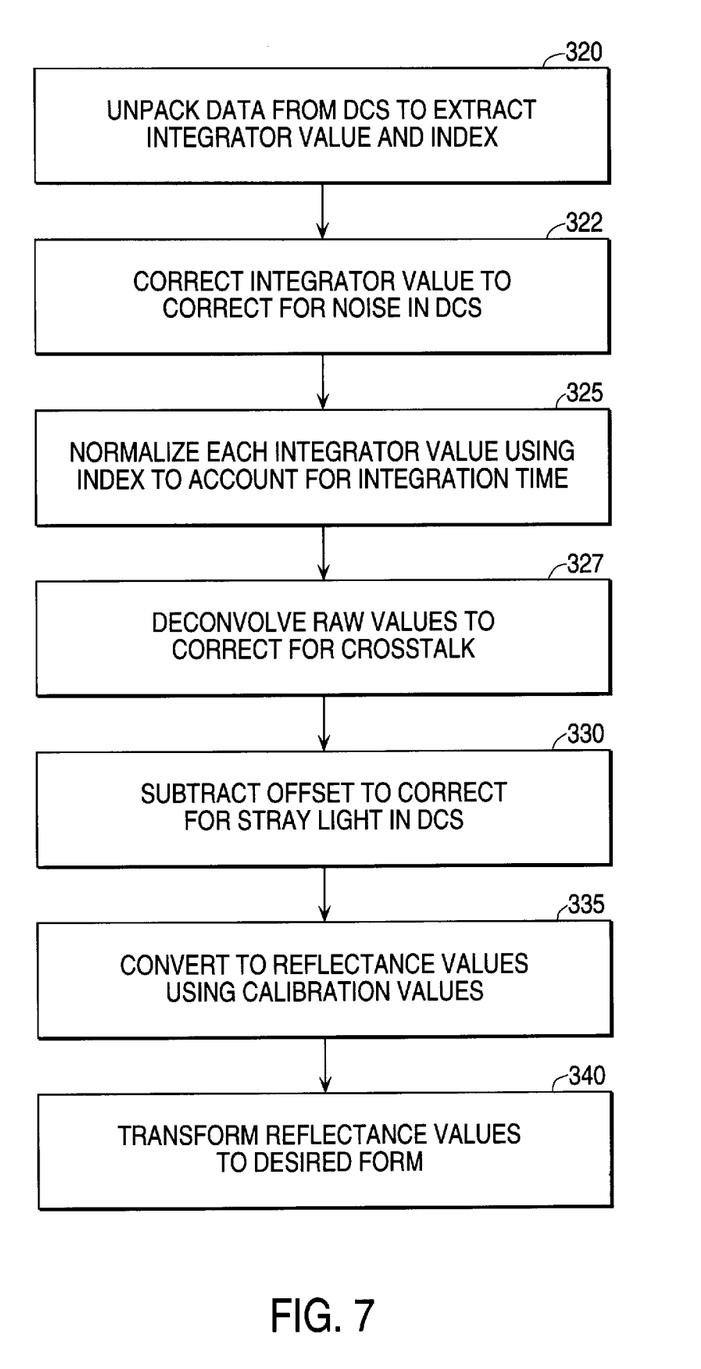
FIG. 7 is a flow chart showing a reflectance calculation.

FIG. 7 is a flow chart showing a method performed by host computer 15 to process the raw data from DCS 20. This method represents some of the steps within the step designated 220 in FIG. 5. The packed 16-bit data items from the DCS are first unpacked to extract the index and the integrator value from each (step 320). The integrator values are then corrected by subtracting a set of values, referred to as Dark(i), corresponding to noise in the DCS electronics (step 322).

The integrator values are then normalized to account for the fact that they were, in general, obtained with different integration times (step 325). An integrator value associated with an index corresponding to a short integration time represents more flux than the same integrator value associated with an index corresponding to a longer integration time. In particular, each integrator value is multiplied by a factor of $2^{(15-index)}$ since each increment of the index represents a factor of 2 in integration time to provide a raw flux value.

Each of the raw flux values, thus obtained, is then subjected to a deconvolution in order to correct crosstalk between the bands (step 327). In this context, crosstalk refers to the fact that imperfections, such as faulty scattering by the grating, can cause light reaching the detector for a grating setting corresponding to a particular band to have contributions from other bands. The particulars of the deconvolution process will be described below, but it is noted that the deconvolution correction for a given spectral band normally depends on the values for the other bands.

If the measurement is a reflectance measurement, each value, so deconvolved, is corrected by subtracting an offset, referred to as Black(i) corresponding to stray light in the DCS (step 330).

Additional processing of the now-corrected measured flux values depends on the type of measurement. For example, for a reflectance measurement, the flux values are converted to reflectance values using stored calibration information (step 335), and these reflectance values are converted to a desired form, e.g., CMYK (step 340).

Factory Calibration

As noted above, DCS 20 is calibrated during manufacture, and calibration information is stored in EEPROM 120 for subsequent use in converting the measured flux values to appropriate color values. The DCS is also provided with a calibration target, which is used in the field to perform periodic calibrations to account for possible changes in the spectral output of light sources 42 and 43 and the spectral response of detector 40.

The calibration target has at least one flat surface, and is preferably a cardboard or plastic sheet having printed thereon at least a white patch, referred to as the Standard White Tile (SWT). The calibration target preferably also includes cyan, magenta, yellow, 50% gray, and black patches. As will be seen below, the calibration information stored in the EEPROM depends on the specific calibration target, so that if it is necessary to replace the calibration target, new values will have to be loaded into the EEPROM. The discussion that follows is in terms of a single DCS being calibrated at the factory.

The DCS is first subjected to wavelength alignment where the angle of the diffraction grating is adjusted mechanically so that the DCS is wavelength calibrated to within about 1.25 nm, which is half the stepper motor resolution. Monochromatic sources such a narrowband laser and a mercury arc lamp may be used to verify the calibration.

The DCS is then used to make several measurements of a dark surface with the light sources on to warm the DCS to a stable operating temperature.

Prior to any additional calibration steps, a zero reflectance measurement is made to generate the Dark(i) values. The DCS is used to make a number of measurements (say ten) of an effective black hole (a zero-reflectance target) with the light sources off and the DCS in a position so that no light can leak into the aperture. The integrator values for each wavelength band are averaged to provide a measure of the DCS's underlying noise level. The main source of noise is residual charge on the integrator's capacitor when the integrator is reset. The measured integrator values for the 32 spectral bands constitute the Dark(i) values, and are stored for further use during the calibration.

The DCS is then used to make a number of measurements of the effective black hole, but with the light sources on, and the flux values for each band are averaged. The values for the 32 bands are stored for further use during the calibration, the measured value for the ith band constituting the Black(i) value. Since the reflectance values for this measurement should be zero, the measured values represent a measure of stray light in the DCS (e.g., light reflections from the aperture). The Black(i) values are flux values (not integrator values). The DCS data giving rise to these values is subjected to the corrections described above using the Dark(i) values determined in the previous calibration steps, as well as the deconvolution.

The DCS is used to measure reflectance from a Master white Tile (MWT). The MWT is a stable ceramic white tile whose spectral response has been measured by a standards laboratory and is known in absolute terms. The known reflectance value for the $i^{th}$ spectral band for the MWT is referred to as MWTrefl(i). The corrected measured values for the 32 spectral bands are stored for further use during the calibration, the corrected measured value for the $i^{th}$ band being referred to as MWTfac(i). The DCS data giving rise to these values is subjected to the corrections described above using the Dark(i) and Black(i) values determined in the previous calibration steps, as well as the deconvolution.

The DCS is then used to measure reflectance from the white patch on the calibration target, and the values for the 32 spectral bands are stored for further use during the calibration, the corrected measured value for the $i^{th}$ band being referred to as SWTfac(i). Again, the DCS data values are corrected and deconvolved as above.

A set of calibration constants SWTrefl(i) are computed on the basis of the known and measured values of the MWT reflectance and the measured values of the SWT reflectance as follows:

$$SWTrefl(i)=MWTrefl(i)*SWTfac(i)/MWTfac(i)$$

The SWTrefl(i) values are the absolute reflectance values for the SWT, and are stored in the EEPROM, along with the integration times for the MWT measurement. They are stored as 32 numbers with 15 bits of precision (i.e., signed 16-bit integers). As an alternative, the SWT can be measured with a standard laboratory-grade spectrophotometer to generate the SWTrefl(i) values.

The DCS is also used to measure emission from a Master White Light source and the measured values are stored for use in connection with later emissive measurements (such as monitor calibration) by the user.

The DCS is used to measure the remaining color patches on the calibration target, and corresponding XYZ values are stored in the EEPROM for possible diagnostic use in the field.

The DCS serial number is stored in the EEPROM, and printed on stickers, which are affixed to the DCS unit and the calibration target. The calibration target is shipped with the DCS for subsequent use.

Periodic Field Calibration

Over the course of time, it is expected that the spectral output of light sources 140 and the spectral response of detector 145 will drift. In view of this, provision is made for the user to perform a periodic calibration in the field, say on a daily basis. The field calibration entails some of the same steps as the factory calibration, and proceeds as follows.

The DCS is used to make a number of measurements as described above to generate new Dark(i) and Black(i) values, which are stored by the host computer.

The DCS is then used to make a number of measurements of the calibration target's white patch (i.e., the SWT) with the light sources on. The flux values for each wavelength band are averaged to provide a measure of how much the DCS's spectral behavior has changed since the factory calibration. The values for the 32 spectral bands are stored by the host computer for further use during actual reflectance measurements, the measured value for the $i^{th}$ band being referred to as SWTfield(i). The measurements are corrected (using the Dark(i) and Black(i) values from the previous calibration steps) and deconvolved.

Reflectance Measurement of Unknown Sample

A reflectance measurement of an unknown sample uses the stored SWTrefl(i) from EEPROM 110 and the corrected SWTfield(i) values determined during the most recent field calibration. If the raw data items from DCS 20, as modified by steps 320, 322, 325, 327, and 330 are called meas(i), the reflectance values, referred to as refl(i) are given by the following:

refl(i)=meas(i)*SWTrefl(i)/SWTfield(i)

This calculation takes into effect the way that the spectral behavior of the DCS might differ from when it was calibrated at the factory.

Updating for New Calibration Target

Since the correction for reflectance measurements depends on the user performing periodic field calibrations with the calibration target, it is necessary that the calibration target be kept in a safe, clean, dry, dark place. In the event that the calibration target is lost or damaged, it is necessary to obtain a new calibration target. However, as discussed above, the calibration constants SWTrefl(i) stored in the EEPROM are based on measurements of the MWT and the calibration target's SWT made with the DCS at the factory.

While it would at first appear that the loss of the calibration target would make it necessary to return the DCS to the factory for recalibration, such is not the case. Rather, it is only necessary that the MWT and the SWT of a new calibration target be measured at the factory using another similar DCS, new values of SWTrefl(i) calculated as discussed above, and the new calibration target along with the new SWT reflectance values be sent to the user. Alternatively, the reflectance values for the new SWT can be measured using a standard spectrophotometer. Regardless of how the new SWTrefl(i) were generated, the user need only execute a program that copies the new SWTrefl(i) values into the EEPROM. Subsequent field calibrations and measurements will proceed as with the original calibration target.

Deconvolution Process

As mentioned above, an additional source of error arises from crosstalk between spectral bands. Internal imperfections, such as faulty scattering by grating 35, lead to unequal errors across the spectrum. This is sometimes referred to as veiling glare. Light sources 42 and 43 emit different amounts of energy in different spectral bands, monochromator 35 has different efficiency in different spectral bands, and detector 40 has different degrees of sensitivity in different bands.

The effect can be modelled as follows. Let $g(\lambda)$ be the measured value of flux for a given wavelength $\lambda$, $f(\lambda)$ the actual value (i.e., the value if there were no veiling glare), and $W(\lambda,\lambda')$ a function that specifies the amount of light at wavelength $\lambda'$ that is scattered so as to be detected as if at wavelength $\lambda$. The measured value is then given by the sum of the actual value $f(\lambda)$ and an error term that is the convolution of the actual value with the function $W(\lambda,\lambda')$, namely:

$$g(\lambda) = f(\lambda) + \int W(\lambda, \lambda') f(\lambda') d\lambda'$$

The integration is carried out over the range of wavelengths $\lambda'$ that can scatter into the detector when the grating is set for a measurement at wavelength $\lambda$.

Since the error term is generally small, $f(\lambda)$ can be approximated by $g(\lambda)$ for purposes of the error term, and the equation can be approximated as follows:

$$g(\lambda) \simeq f(\lambda) + \int W(\lambda, \lambda') g(\lambda') d\lambda'$$

or equivalently as:

$$f(\lambda) \simeq g(\lambda) - \int W(\lambda, \lambda') g(\lambda') d\lambda'$$

This analysis carries over to the situation where $f(\lambda)$ and $g(\lambda)$ are N×1 column vectors denoting measured and actual values for the N bands (N is 32 in the specific embodiment). In this case, the function $W(\lambda,\lambda')$ becomes an N×N error matrix, with the element $W(i,j)$ in the $i^{th}$ row and $j^{th}$ column specifying the spurious relative contribution of light in the $j^{th}$ band to the measurement for the $i^{th}$ band. The equation for f(i), the actual value for the $i^{th}$ band, in terms of g(i), the measured value for the $i^{th}$ band, then becomes:

$$f(i) = g(i) - \sum_{j=1}^{N} W(i,j) g(j)$$

Working from the above model, one would need to determine the actual values of the constants $W(i,j)$, which form the N×N error matrix. To do so, one would have to make many measurements and apply statistical analysis to arrive at accurate values. This would entail a huge number of measurements.

This expensive and error-prone step can be avoided, based on the recognition that the spectral energy of the light sources, the efficiency of the monochromator, and the sensitivity of the detector all vary smoothly with wavelength. Therefore, the N bands can be grouped into a smaller number M (M is 4 in the specific embodiment) of possibly overlapping groups and each group represented by a weighted average of the values of its component bands in the measured signal. In the specific embodiment, the four bands are centered at 440 nm, 550 nm, 620 nm, and 700 nm.

Put another way, the result of the error term does not change significantly if the error matrix is reduced to an N×M (32×4) matrix W' where the element W'(i,k) specifies the spurious relative contribution from light in the $k^{th}$ band, where there are now fewer bands (4 in the specific embodiment). The values of the N×M matrix W' are determined by measurement and statistical analysis.

For the error correction, the N×1 vector g of measured values g(i) needs to be reduced to a M×1 vector g' of averaged measured values g'(k).

The equation then becomes:

$$f(i) = g(i) - \sum_{k=1}^{M} W'(i, k)g'(k) \ (i = 1, \ldots N)$$

The reduced vector g' is derived from the measured vector g by an M×N transformation matrix A as follows:

$$g'(k) = \sum_{i=1}^{N} A(k, i)g(i)$$

A(k,i) is the weight of the $i^{th}$ spectral band in the weighted average of the values for the $k^{th}$ group. A(k,i)=0 if the $i^{th}$ spectral band is not part of the group. In practice the remaining values might all be 1/(n(k)), where n(k) is the number of bands in the $k^{th}$ group. It is also possible to subsample the g vector rather than average. This is equivalent to using an M×N matrix where each row has only one non-zero value.

In the specific embodiment, a single M×N matrix A and a single N×M matrix W' apply to all DCSs, so these values are stored in the application software. Another approach would be to determine device-specific values for each DCS as part of the factory calibration and store those values in the EEPROM. Yet another approach would be to determine these values as part of field calibration and store them in the host computer.

This correction, which amounts to an approximate deconvolution of the measured values g(i), is assumed to be carried out after the measured values have been corrected with the Dark(i) and Black(i) values as described above.

| High Level Command | Byte Structure |
|---|---|
| Reset () | [1]['R'] |
| Flush () | [1]['F'] |
| ReadStat(Status[0 . . . 3]) | [1]['S'] |
| ReadScan(ScanType, StrtBand, N, ITImin, ITImax, Flux[0 . . . N]) | ['b'][ScanType][StrtBand[[N] [ITImin] [ITImax] |
| MoveRel(Steps) | ['r'][Steps] |
| MoveHome () | ['s'] |
| LampOn () | ['m']['1'] |
| LampOff () | ['m']['0'] |
| ReadDAD (ITImin, ITImax, Flux) | ['n'][ITImin][ITImax] |
| ReadOCAD (Channel, BValue) | ['o'][Channel] |
| ReadFVer (FVer[0 . . . 3]) | ['h'] |
| BatChrgEnable () | ['x']['1'] |
| BatChrgDisable () | ['x']['0'] |
| WritEPRM (Addr,N,WValue[0 . . . N]) | ['t'][Addr][N] . . . {WValue[0 . . . N]} |
| ReadEPRM (Addr,N,WValue[0 . . . N]) | ['u'][Addr][N] . . . {WValue[0 . . . N]} |

The Reset and Flush commands set DCS 20 to its initial state by absorbing all commands in process, clearing RAM, flags, pointers, and interrupts, turning the light sources off, and clearing the input and output buffers. The commands also determine whether the DCS is connected to an ADB port or a serial port and configure interrupt driven communications accordingly. The Reset command (but not the Flush command) resets the ADB address to its default if the DCS is connected to the ADB.

The ReadStat command reads the DCS status and error bytes. In the specific embodiment five bits signify the battery and power state (dead, low, charging, needs charging, external source). Two more bits signify whether measurement foot 26 is closed and whether light sources 42 and 43 are on. These bits are periodically updated by the DCS (say every 10 milliseconds). A number of bits signify various errors and are latched, only to be reset by the Reset, Flush, and ReadState commands. These errors include unexpected states of the measurement foot, light sources, or battery, and various data and communications errors.

The ReadScan command performs measurements of the specified type for the specified range of bands using the specified range of integration times.

The MoveRel command moves stepping motor 152 the specified number of steps in the specified direction.

The MoveHome command moves the stepping motor to its home position, which is defined by a hard stop.

The Lampon and Lampoff commands turn light sources 42 and 43 on or off.

The ReadDAD command reads A/D converter 160 (coupled to integrator 155) and returns a flux value.

The ReadOCAD command reads a selected A/D converter channel and returns the value. This allows quantities such as battery voltage, lamp voltage, and voltage supplies to be checked.

The ReadFVer command reads the firmware version of the DCS ROM.

The WriteEPRM and ReadEPRM commands write and read the specified number of 16-bit values into or from EEPROM 110 starting at the specified address. In the specific embodiment, the EEPROM contains various information about the DCS. This includes calibration information for emissive and reflectance measurements, board and case serial numbers, and the motor offset from the home hard stop and the center frequency of the band at 700 nm.

The BatChrgEnable and BatChrgDisable commands enable or disable the battery charging logic.

Conclusion

In conclusion, it can be seen that the allocation of computational workload between the DCS computer and the host computer, the automatic measurement to a desired level of precision, and the veiling glare deconvolution contribute to the present invention's ability to provide precise and accurate color measurements at relatively low cost.

While the above is a complete description of specific embodiments of the invention, various modifications, alternative constructions, and equivalents may be used. Therefore, the above description should not be taken as limiting the scope of the invention as defined by the claims.

What is claimed is:

1. A method of correcting errors in light measurements in a color sensing device that provides spectral information regarding a light source, such errors arising from imperfections in the color sensing device, the method comprising:

generating a plurality of spectral measurements, the number in the plurality being designated N, each spectral measurement representing an amount of light in a respective one of a plurality of N spectral bands;

providing crosstalk information quantifying the degree to which the color sensing device is characterized by light in a particular spectral band contributing to measurements of light in other spectral bands;

generating a correction value for each spectral band, the correction value based on the plurality of spectral measurements and on said crosstalk information; and correcting the spectral measurement for each spectral band by subtracting said correction value for that band;

wherein the crosstalk information is in the form of a correction matrix having a first dimensionality N and a second dimensionally designated M; and said generating a correction value for each spectral band comprises:

generating an M×1 vector representing the plurality of N spectral measurements where M is an integer no greater than N, and generating an N×1 vector that is the product of the correction matrix and the M×1 vector, wherein the N×1 vector has N elements, each of which is a respective correction value.

2. The method of claim 1 wherein M is less than N.

3. The method of claim 1 wherein M=4 and N=32.

4. The method of claim 1 wherein:

M is less than N; and said M×1 vector is generated by determining M weighted averages derived from the plurality of spectral measurements, each weighted average being centered around a respective one of M wavelengths in the range of the N spectral bands.

5. The method of claim 1 wherein:

M is less than N; and said M×1 vector is generated by subsampling M of N spectral measurements, each subsampled spectral measurement being for a band near a respective one of M wavelengths in the range of the N spectral bands.

6. A method of calibrating and using an individual color sampling device having an illumination source and a writable non-volatile memory, the method comprising:

providing, for the individual color sampling device, an individual tile;

generating a set of reflectance information regarding the individual tile;

storing the set of reflectance information regarding the individual tile in the non-volatile memory as calibration information;

subsequent to said above-recited steps, measuring, with the individual color sampling device, reflection from the individual tile using the illumination source and producing a set of spectral values referred to as the tile values;

subsequently, measuring a sample of unknown reflectance characteristics to produce another set of spectral values referred to as the sample values; and using the set of reflectance information, the tile values and the sample values to generate reflectance information regarding the sample.

7. The method of claim 6 wherein the reflectance information regarding the individual tile is generated by:

providing a master tile having known stable reflectance characteristics;

measuring, with the individual color sampling device, reflection from the master tile using the illumination source and producing a first set of spectral values;

measuring, with the individual color sampling device, reflection from the individual tile using the illumination source and producing a second set of spectral values;

said first-mentioned and second-mentioned measuring steps being performed sufficiently close in time so that the illumination source has substantially the same spectral output for said first-mentioned and second-mentioned measuring steps;

using the first and second sets of spectral values and the master tile's reflectance characteristics to provide the set of reflectance information regarding the individual tile.

8. A method of calibrating and using an individual color sampling device comprising:

providing a master tile having known stable reflectance characteristics;

providing, for the individual color sampling device, an individual tile;

measuring, with the individual color sampling device, reflection from the master tile under a first set of illumination conditions and producing a first set of spectral values;

measuring, with the individual color sampling device, reflection from the individual tile under the same first set of illumination conditions and producing a second set of spectral values;

using the first and second sets of spectral values to provide a set of calibration information;

measuring, with the individual color sampling device, reflection from the individual tile under a second set of illumination conditions and producing a third set of spectral values; and using the third set of spectral values in conjunction with the set of calibration information to allow spectral measurements of a sample of unknown reflectance taken with the individual color sampling device under the second set of illumination conditions to generate reflectance information regarding the sample.

9. A method of calibrating and recalibrating a first individual color sampling device having an illumination source and a writable non-volatile memory, the method comprising:

performing a first factory calibration by using the first individual color sampling device to measure relative reflectance of a master tile and a first individual tile, and generating resulting first calibration information;

calibrating the first individual color sampling device for use with the first individual tile by storing the first calibration information in the non-volatile memory;

performing a second factory calibration by using a second individual color sampling device to measure relative reflectance of the master tile and a second individual tile, and generating resulting second calibration information; and recalibrating the first individual color sampling device for use with the second individual tile by storing the second calibration information in the non-volatile memory.

10. A method of calibrating and recalibrating a first individual color sampling device having a first illumination source and a writable non-volatile memory, the method comprising the steps of:

(1) performing a first factory calibration comprising the substeps of:

(a1) providing a master tile having known stable reflectance characteristics;

(b1) providing, for the first individual color sampling device, a first individual tile;

(c1) measuring, with the first individual color sampling device, reflection from the master tile using the first illumination source and producing a first set of spectral values;

(d1) measuring, with the first individual color sampling device, reflection from the first individual tile using the first illumination source and producing a second set of spectral values;

said measuring substeps (c1) and (d1) being performed sufficiently close in time so that the first illumination source has substantially the same spectral output for said measuring substeps (c1) and (d1); and (e1) using the first and second sets of spectral values and the master tile's reflectance characteristics to provide a first set of calibration information;

(2) calibrating the first individual color sampling device for use with the first individual tile by storing the first set of calibration information in the non-volatile memory;

(3) performing a second factory calibration comprising the substeps of:

(a3) providing a second individual color sampling device having a second illumination source;

(b3) providing a second individual tile;

(c3) measuring, with the second individual color sampling device, reflection from the master tile using the second illumination source and producing a third set of spectral values;

(d3) measuring, with the second individual color sampling device, reflection from the second individual tile using the second illumination source and producing a fourth set of spectral values;

(e3) said measuring substeps (c3) and (d3) being performed sufficiently close in time so that the second illumination source has substantially the same spectral output for said measuring substeps (c3) and (d3); and (f3) using the third and fourth sets of spectral values and the master tile's reflectance characteristics to provide a second set of calibration information; and (4) recalibrating the first individual color sampling device for use with the second individual tile by storing the second set of calibration information in the non-volatile memory.

11. A method of correcting errors in light measurements in a color sensing device that provides spectral information regarding a light source comprising:

generating a plurality of spectral measurements, the number in the plurality being designated N, each spectral measurement representing an amount of light in a respective one of a plurality of N spectral bands;

providing crosstalk information quantifying the degree to which the color sensing device is characterized by light in a particular spectral band contributing to measurements of light in other spectral bands, wherein the crosstalk information includes errors arising from imperfections in the color sensing device;

generating a correction value for each spectral band, the correction value based on the plurality of spectral measurements and on said crosstalk information; and correcting the spectral measurement for each spectral band by subtracting said correction value for that band;

wherein the crosstalk information is in the form of a correction matrix having a first dimensionality N and a second dimensionality designated M; and said generating a correction value for each spectral band comprises:

generating an M×1 vector representing the plurality of N spectral measurements where M is an integer no greater than N, and generating an N×1 vector that is the product of the correction matrix and the M×1 vector, wherein the N×1 vector has N elements, each of which is a respective correction value.

12. The method of claim 11 wherein M is less than N.

13. The method of claim 11 wherein M=4 and N=32.

14. The method of claim 11 wherein: M is less than N; and said M×1 vector is generated by determining M weighted averages derived from the plurality of spectral measurements, each weighted average being centered around a respective one of M wavelengths in the range of the N spectral bands.

15. The method of claim 11 wherein:

M is less than N; and said M×1 vector is generated by subsampling M of N spectral measurements, each subsampled spectral measurement being for a band near a respective one of M wavelengths in the range of the N spectral bands.

* * * * *